US011594929B2

(12) United States Patent
Yao et al.

(10) Patent No.: US 11,594,929 B2
(45) Date of Patent: Feb. 28, 2023

(54) AXIAL FLUX MOTOR WITH DISTRIBUTED WINDING

(71) Applicant: GM GLOBAL TECHNOLOGY OPERATIONS LLC, Detroit, MI (US)

(72) Inventors: Jian Yao, Shanghai (CN); Chengwu Duan, Shanghai (CN); Mingyuan Zhang, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 172 days.

(21) Appl. No.: 16/779,788

(22) Filed: Feb. 3, 2020

(65) Prior Publication Data

US 2021/0143700 A1    May 13, 2021

(30) Foreign Application Priority Data

Nov. 13, 2019   (CN) .......................... 201911106705.0

(51) Int. Cl.
*H02K 3/28* (2006.01)
*H02K 1/18* (2006.01)

(52) U.S. Cl.
CPC .............. *H02K 3/28* (2013.01); *H02K 1/182* (2013.01)

(58) Field of Classification Search
CPC ...... H02K 1/182; H02K 1/2793; H02K 21/24; H02K 1/2766; H02K 3/18; H02K 16/04; Y02T 10/64
See application file for complete search history.

(56) References Cited

U.S. PATENT DOCUMENTS 4,463,303 A * 7/1984 Kirschbaum ........... H02P 25/20
                                                           318/776
6,894,413 B2   5/2005 Nakano et al.
(Continued)

FOREIGN PATENT DOCUMENTS

CN       207743770 U    8/2018
CN       112803691 A    5/2021
(Continued)

OTHER PUBLICATIONS

Machine Translation of WO 2016084219 A1 (Year: 2016).*
(Continued)

*Primary Examiner* — Quyen P Leung
*Assistant Examiner* — Minki Chang
(74) *Attorney, Agent, or Firm* — Harness, Dickey & Pierce, P.L.C.

(57) ABSTRACT

An axial flux motor having reduced spatial harmonics including a rotor with a plurality of magnets. A rotor shaft is coupled to the rotor. A stator faces the rotor and an air gap defined between the rotor and the stator. The stator includes a plurality of electromagnetic components defining a plurality of magnetic poles. The electromagnetic components include a plurality of posts, a plurality of slots, and a plurality of distributed electrically conductive windings disposed in and spanning across nonadjacent slots of the plurality of slots. At least one electrically conductive winding has a winding pitch span of greater than or equal to about 3 to less than or equal to about 20. The axial flux motor may include two rotors and one stator or alternatively two stators and one rotor. Such axial flux motors have short pitch provide desirable reduced spatial harmonics to enhance motor performance.

17 Claims, 5 Drawing Sheets

(56) References Cited

U.S. PATENT DOCUMENTS

| | | | |
|---|---|---|---|
| 7,692,357 B2 | 4/2010 | Qu et al. | |
| 8,466,592 B2 | 6/2013 | Atallah et al. | |
| 9,742,225 B2 | 8/2017 | Klassen et al. | |
| 9,755,463 B2 | 9/2017 | Klassen et al. | |
| 9,882,518 B2 | 1/2018 | McLean | |
| 9,917,484 B2 | 3/2018 | Aoyama | |
| 9,963,185 B2 | 5/2018 | Neugebauer et al. | |
| 10,291,086 B2 | 5/2019 | Deak et al. | |
| 2005/0035676 A1* | 2/2005 | Rahman | B60L 7/14 180/65.6 |
| 2009/0230806 A1* | 9/2009 | Miyata | H02K 19/12 310/195 |
| 2012/0001512 A1* | 1/2012 | Dajaku | H02K 21/12 310/195 |
| 2012/0126652 A1 | 5/2012 | Shah et al. | |
| 2014/0285048 A1 | 9/2014 | Seo et al. | |
| 2017/0047821 A1* | 2/2017 | Klassen | B25J 15/08 |
| 2017/0155291 A1 | 6/2017 | Deak et al. | |
| 2018/0323663 A1* | 11/2018 | Ogawa | H02K 1/145 |
| 2019/0020239 A1 | 1/2019 | Tsujimori | H02K 15/105 |
| 2019/0165632 A1* | 5/2019 | Mabuchi | C08L 63/00 |
| 2019/0273406 A1 | 9/2019 | Gehlert et al. | |
| 2019/0283972 A1 | 9/2019 | Yasinski | |
| 2019/0288571 A1 | 9/2019 | Lehikoinen et al. | |
| 2019/0288584 A1 | 9/2019 | Vansompel et al. | |
| 2019/0363598 A1 | 11/2019 | Coppola et al. | |
| 2020/0251946 A1 | 8/2020 | Yao et al. | |
| 2020/0274410 A1 | 8/2020 | Yao et al. | |
| 2021/0152040 A1 | 5/2021 | Yao et al. | |
| 2021/0152041 A1 | 5/2021 | Duan et al. | |

FOREIGN PATENT DOCUMENTS

| | | |
|---|---|---|
| CN | 112821702 A | 5/2021 |
| DE | 102020127228 A1 | 5/2021 |
| DE | 102020127447 A1 | 5/2021 |
| EP | 3012944 A1 | 4/2016 |
| EP | 1416254 B1 | 2/2017 |
| WO | WO-2016084219 A1 * | 6/2016 |

OTHER PUBLICATIONS

Diemens, Kevin, "A New Generation of Axial Flux EV Motors," Electric & Hybrid Vehicle Technology Expo—Novi, Michigan, May 21, 2018 [retrieved on Dec. 11, 2019], Retrieved from the Internet: <URL: https://www.designnews.com/content/new-generation-axial-flux-ev-motors/1 86519862158706>, 4 pages.

Hannon, Bert et al., "Time- and Spatial-Harmonic Content in Electrical Machines and its Applicationin Fourier-Based Models," 2016 XXII International Conference on Electrical Machines (ICEM), Sep. 4-7, 2016; Doi: 10.1109/ICELMACH.2016.7732586.

Moreels, Daan, "Axial Flux vs Radial Flux: 4 Reasons why Axial Flux Machines have a Higher Power Density," Magnax, Jan. 31, 2018 [retrieved on Dec. 11, 2019]. Retrieved from the Internet: <URL: https://www.magnax.com/magnax-blog/axial-flux-vs-radial-flux.-4-reasons-why-does-axial-flux-machines-deliver-a-higher-power-density>, 12 pages.

Moreels, Daan, "Axial-Flux Motors and Generators Shrink Size, Weight," Power Electronics , Jul. 13, 2018, [retrieved an Dec. 11, 2019]. Retrieved from the Internet: <URL: https://www.powerelectronics.com/automotive/axial-flux-motors-and-generators-shrink-size-weight>, 13 pages.

Park, Jae-Do et al., "Analysis and Reduction of Time Harmonic Rotor Loss in Solid-Rotor Synchronous Reluctance Drive," IEEE Transaction on Power Electronics, vol. 23, No. 2 (Mar. 2008); DOI: 10.1109/TPEL.2007.91522.

* cited by examiner

AXIAL FLUX MOTOR WITH DISTRIBUTED WINDING

CROSS-REFERENCE TO RELATED APPLICATIONS

This application claims the benefit of and priority to Chinese Patent Application No. 201911106705.0, filed Nov. 13, 2019. The entire disclosure of the above application is incorporated herein by reference.

Introduction

This section provides background information related to the present disclosure which is not necessarily prior art.

The present disclosure relates generally to axial flux motors having stator designs for reduced spatial harmonics to improve performance.

Electric motors convert electrical energy into mechanical work by the production of torque. Electric vehicles, including hybrid vehicles, employ electric motors, such as induction motors and permanent magnet motors, to propel the vehicles, as well as to capture braking energy when acting as an electric generator. Generally, the electric motor includes a rotor that rotates during operation and a stator that is stationary. The rotor may contain a plurality of permanent magnets and rotates relative to the fixed stator. The rotor is connected to a rotor shaft that also rotates with the rotor. The rotor, including the permanent magnets, is separated from the stator by a predetermined air gap. The stator includes conductors in the form of wire windings. When electrical energy is applied through the conductive wire windings, a magnetic field is generated. When electric energy or power is fed into the conductive windings of the stator, the power can be transferred over the air gap by a magnetic flux creating torque that acts on the permanent magnets in the rotor. In this manner, mechanical power can be transferred to or extracted from the rotating rotor shaft. In an electric vehicle, the rotor thus transmits torque via the rotating shaft through a gear set to the drive wheels of the vehicle.

Two common types of electric motors include radial flux or axial flux type motors. In a radial flux motor, the rotor and stator are typically situated in a concentric or nested configuration, so that when a stator is energized, it creates a magnetic flux that extends radially from the stator to the rotor. Thus, the conductive windings in the stator are typically arranged perpendicular to an axis of rotation so that a magnetic field is generated that is oriented in the radial direction from the axis of rotation (along the rotor shaft). In an axial flux motor, a magnetic field parallel to an axis of rotation is produced by the electrically conductive wire windings in the stator, so the magnetic flux extends parallel to an axis of rotation (parallel to the rotor shaft). In certain applications, axial flux motors are desirable because they are relatively lightweight, generate increased power, and have a compact size as compared to radial flux motors.

SUMMARY

This section provides a general summary of the disclosure, and is not a comprehensive disclosure of its full scope or all of its features.

The present disclosure relates to an axial flux motor having reduced spatial harmonics. In certain variations, the axial flux motor includes a rotor including a plurality of magnets and a rotor shaft coupled to the rotor. The rotor shaft defines a rotational axis about which the rotor is configured to rotate. A stator faces the rotor and defines an air gap therebetween. The stator is stationary and includes a plurality of electromagnetic components defining a plurality of magnetic poles. The plurality of electromagnetic components includes a plurality of posts, a plurality of slots, and a plurality of distributed electrically conductive windings disposed in and spanning across nonadjacent slots of the plurality of slots. At least one electrically conductive winding of the plurality of distributed conductive windings has a winding pitch span of greater than or equal to about 3 to less than or equal to about 20.

In one aspect, each of the plurality of distributed electrically conductive windings has the winding pitch span that is greater than or equal to about 3 to less than or equal to about 10.

In one aspect, the winding pitch span is 5.

In one aspect, a respective slot of the plurality of slots has a maximum number of electrically conductive windings of 10.

In one aspect, a slot stager is greater than or equal to about 1 and less than or equal to about 8.

In one aspect, the plurality of magnetic poles is greater than or equal to 2 to less than or equal to about 30.

In one aspect, spatial harmonics for orders of less than or equal to a first order harmonic frequency are eliminated in the axial flux motor and spatial harmonics for orders of greater than or equal to the first order harmonic frequency are reduced by greater than or equal to about 50%.

In one aspect, the plurality of slots is greater than or equal to about 12 to less than or equal to about 96.

In one aspect, the plurality of magnetic poles is 8, a pitch of the plurality of magnetic poles is about 6 degrees, the plurality of slots is 48, there are two layers of electrically conductive windings per slot, a number of electrically conductive windings per slot is 2, and a slot stager is 1.

In one aspect, the axial flux motor is a three-phase motor and includes three phases of distributed electrically conductive windings.

In one aspect, the stator includes an insulated metal strip coiled to form an annular shape that defines the plurality of post sand the plurality of slots.

The present disclosure also relates to an axial flux motor having reduced spatial harmonics including two disc-shaped rotors each including a plurality of magnets. Further, the axial flux motor includes a rotor shaft coupled to the two disc-shaped rotors. The rotor shaft defines a rotational axis about which the disc-shaped rotors are configured to rotate. A disc-shaped stator is disposed between the two disc-shaped rotors. The disc-shaped stator is stationary and includes a plurality of electromagnetic components defining a plurality of magnetic poles. The plurality of electromagnetic components includes a plurality of posts, a plurality of slots of greater than or equal to about 12 to less than or equal to about 96, and a plurality of distributed electrically conductive windings disposed in and spanning across nonadjacent slots of the plurality of slots. At least one electrically conductive winding has a winding pitch span of greater than or equal to about 3 to less than or equal to about 20. The axial flux motor also has a first air gap defined between a first of the disc-shaped rotors and the disc-shaped stator. A second air gap is defined between a second of the disc-shaped rotors and the disc-shaped stator.

In one aspect, the plurality of electromagnetic components includes a first plurality of electromagnetic component and a second plurality of electromagnet components. The disc-shaped stator includes a first side having the first plurality of electromagnetic components that faces a first rotor of the two disc-shaped rotors and defines the first air gap. The disc-shaped stator includes a second side having the second plurality of electromagnetic components that faces a second rotor of the two disc-shaped rotors and defines the second air gap.

In one aspect, the disc-shaped stator includes a first side that faces a first rotor of the two disc-shaped rotors and defines the first air gap and the disc-shaped stator. A second side of the disc-shaped stator faces a second rotor of the two disc-shaped rotors and defines the second air gap.

In one aspect, spatial harmonics for an order of less than or equal to 7 are eliminated in the axial flux motor and spatial harmonics for orders of greater than or equal to 7 are reduced by greater than or equal to about 50%.

In one aspect, the plurality of magnetic poles is 8, a pitch of the plurality of magnetic poles is about 6 degrees, the plurality of slots is 48, there are two layers of electrically conductive windings per slot, a number of electrically conductive windings per slot is 2, and a slot stager is 1.

The present disclosure further relates to an axial flux motor having reduced spatial harmonics. The axial flux motor has two disc-shaped stators that are stationary. Each of the two disc shaped-stators includes a plurality of electromagnetic components defining a plurality of magnetic poles. The plurality of electromagnetic components includes a plurality of posts, a plurality of slots of greater than or equal to about 12 to less than or equal to about 96, and a plurality of distributed electrically conductive windings disposed in and spanning across nonadjacent slots of the plurality of slots. At least one electrically conductive winding of the plurality of distributed electrically conductive windings has a winding pitch span of greater than or equal to about 3 to less than or equal to about 20. The axial flux motor also has a rotor disposed between the two disc-shaped stators and including a plurality of magnets. A rotor shaft is coupled to the rotor and defines a rotational axis about which the rotor is configured to rotate. A first air gap is defined between a first of the disc-shaped stators and the rotor. A second air gap is defined between a second of the disc-shaped stators and the rotor.

In one aspect, spatial harmonics for an order of less than or equal to 7 are eliminated in the axial flux motor and spatial harmonics for orders of greater than or equal to 7 are reduced by greater than or equal to about 50%.

In one aspect, the plurality of magnetic poles is 8, a pitch of the plurality of magnetic poles is about 6 degrees, the plurality of slots is 48, there are two layers of electrically conductive windings per slot, a number of electrically conductive windings per slot is 2, and a slot stager is 1.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1B show simplified schematics of electrically conductive windings for a stator of an electric motor.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1A:
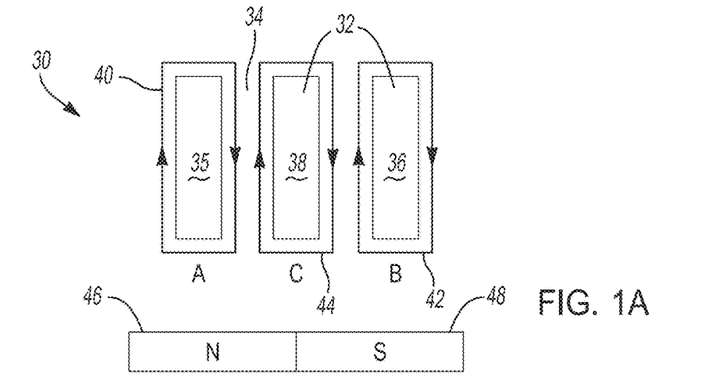
FIG. 1A shows a design having a plurality of concentrated electrically conductive windings for a three-phase motor.
Figure 2:
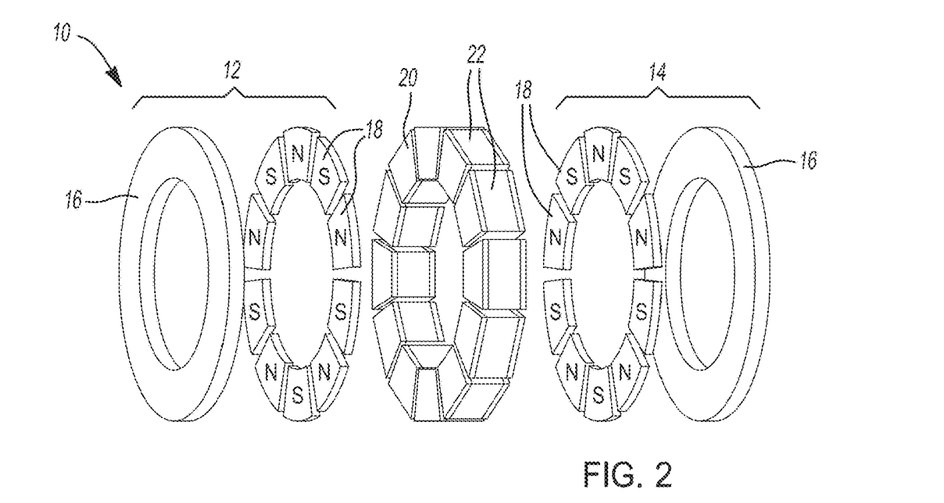
FIG. 2 shows an exploded view of an axial flux motor assembly having one stator and two rotors.

In various aspects, the present disclosure pertains to axial flux motors having diminished spatial harmonics and therefore improved performance. In most axial flux motors, electrically conductive windings in the stator may be in a concentrated configuration for smaller packages. One example of a concentrated electrically conductive winding design 30 is shown in FIG. 1A. FIG. 2 shows a simplified view of an axial flux motor assembly 10 including a disc-shaped first rotor 12 and a disc-shaped second rotor 14 that are configured to rotate. As both the first and second rotors 12, 14 have the same design, their common components will be described herein. Each has a backplate 16 and a plurality of permanent magnets 18. A disc shaped stator 20 is disposed between the first rotor 12 and the second rotor 14. The stator 20 is fixed and stationary, while the first and second rotors 12, 14 rotate during operation. The stator includes a plurality of electromagnetic components 22 that are separated from one another to form electromagnetic poles.

With renewed reference to FIG. 1A, the electromagnetic components of the stator have a plurality of stator teeth or posts 32. A plurality of slots 34 is defined between respective stator posts 32. A first electrically conductive winding 40 having a first phase designated "A" is disposed (e.g., wound at least once) around a first post 35 and within two adjacent slots 34 defined by the first post 35. Likewise, a second electrically conductive winding 42 having a second phase designated "B" is disposed around another second post 36 and within two adjacent slots 34 to the second post 36. Finally, a third electrically conductive winding 44 having a third phase designated "C" is disposed around a third post 38 that is disposed between the first post 35 and the second post 36. The third electrically conductive winding 44 occupies the slots 34 adjacent to the third post 38, which also contain either the first electrically conductive winding 40 or the second electrically conductive winding 42. The configuration shown in FIG. 1A is a 2-pole concentrated winding design having a 0.5 slot/pole/phase. Thus, the first, second, and third electrically conductive windings 40, 42, 44 together define two magnetic poles 46, 48 having opposite polarity (N, S). While many axial flux motors are formed with concentrated windings, they can suffer from more harmonics of spatial flux distribution in the air gap(s), which introduce loss in the magnets and stator core (e.g., iron).

In accordance with various aspects of the present disclosure, a stator having a distributed winding configuration is provided that reduces spatial harmonics, which in turn greatly reduces any loss in the magnets and stator core.

Figure 1B:
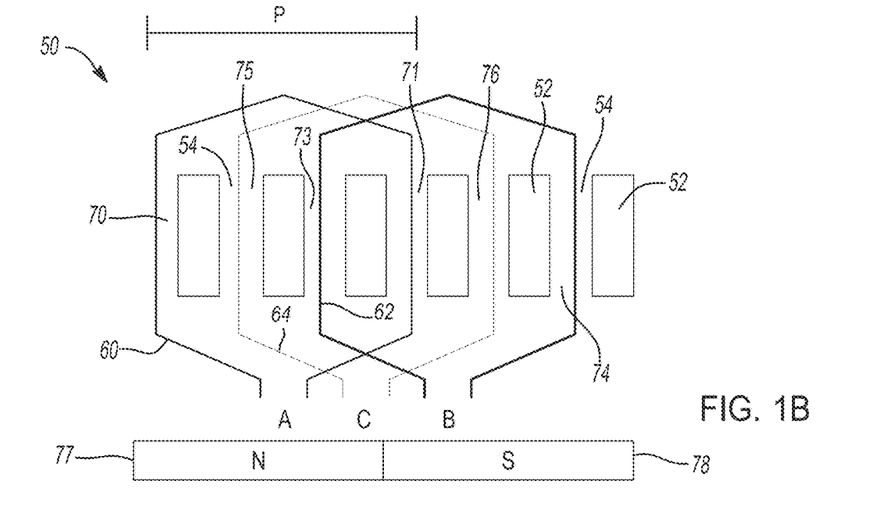
FIG. 1B shows a design having a distributed configuration of a plurality of distributed electrically conductive windings for a three-phase motor.

Generally, a distributed electrically conductive winding can be considered to have windings disposed in and spanning across nonadjacent slots. By way of example, a distributed winding design 50 is shown in FIG. 1B. A stator has a plurality of stator teeth or posts 52. A plurality of slots 54 are defined between respective stator posts 52. In certain aspects, the plurality of slots 54 in an axial flux motor prepared in accordance with the present disclosure may have greater than or equal to about 12 to less than or equal to about 96 slots, for example, in multiples of 12 (e.g., 12, 24, 36, 48, 60, 72, 84, 96). A first electrically conductive winding 60 having a first phase designated "A" is disposed in both a first slot 70 and terminates in a nonadjacent second slot 71 and thus disposed around three posts 52 (having a slot of pitch (designated "P") of 3). A second electrically conductive winding 62 having a second phase designated "B" is disposed in a third slot 73 and a nonadjacent fourth slot 74 and thus disposed around three posts 52 having a pitch of 3. A third electrically conductive winding 64 having a third phase designated "C" is disposed in a fifth slot 75 and a nonadjacent sixth slot 76 and thus disposed around three posts 52 having a pitch of 3. As will be described in greater detail below, in accordance with certain variations of the present disclosure, at least one electrically conductive winding spans from a first slot to a nonadjacent second slot of a stator to define a winding pitch span (P) that is optionally greater than or equal to about 3 to less than or equal to about 20, optionally greater than or equal to about 3 to less than or equal to about 10, optionally greater than or equal to about 3 to less than or equal to about 7, and in certain variations, a winding pitch span of about 5. The configuration shown in FIG. 1B is a 2-pole concentrated winding design having a 1 slot/pole/phase. Thus, the first, second, and third electrically conductive windings 60, 62, 64 together define two magnetic poles 77, 78 having opposite polarity (N, S). By incorporating a distributed winding having a short pitch design, sub-order harmonics can be reduced or eliminated in an axial flux motor.

Figure 3:
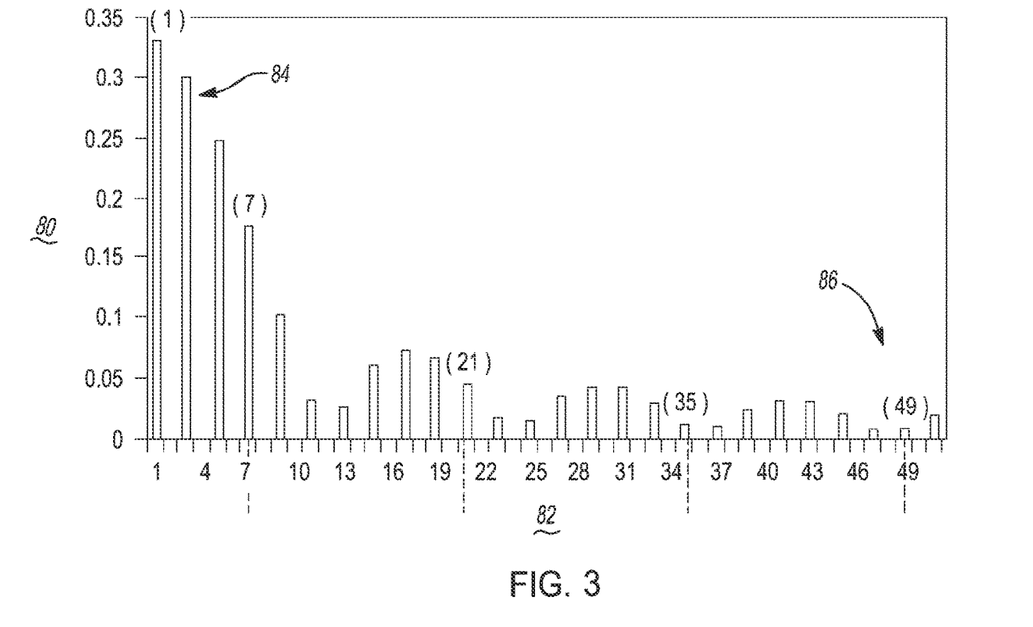
FIG. 3 illustrates spatial harmonics of a concentrated winding design for a motor.
Figure 4:
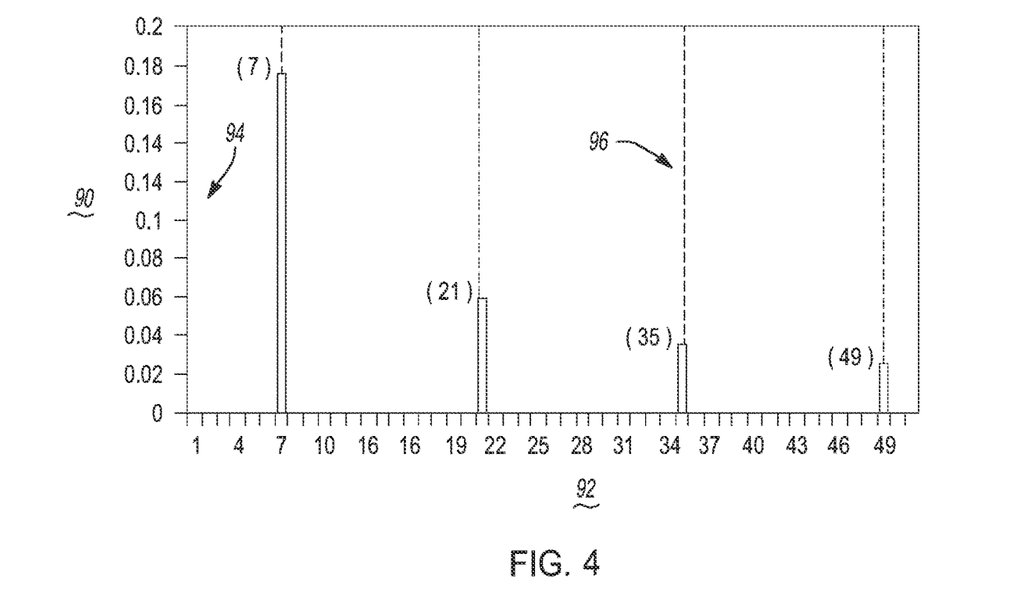
FIG. 4 illustrates spatial harmonics of a distributed winding design for a motor.

FIGS. 3 and 4 further illustrate spatial harmonics of a concentrated winding design (shown in FIG. 3) versus that in a distributed winding design (shown in FIG. 4). In FIG. 3, a y-axis 80 shows winding function harmonic components (turns) versus an x-axis of 82 that represents a Number of Cycles/$2\pi$ mechanical radians. FIG. 3 thus shows synchronous frequency components for a 2/7 slot/pole/phase concentrated winding. The numbers on top of select bars (showing synchronous frequency components) represent spatial harmonic orders of respective winding functions. As can be seen, there are many spatial harmonics at both lower order harmonics (designated 84) and higher order harmonics (designated 86). In the example shown, a synchronized frequency of the motor is 7. Thus, a first order harmonic frequency is 7 in FIG. 3, a third order harmonic frequency is 21, a fifth order harmonic frequency is 35, a seventh order frequency is 49, and so on. Generally, lower order spatial harmonics are understood to be those with a frequency smaller than the first synchronized frequency (7), while higher order spatial harmonics have a frequency larger than the first synchronized frequency (7). FIG. 4 shows a concentrated winding, where aside from the spatial harmonics at first (7), third (21), fifth (35), and seventh (49) order synchronized frequencies, there are also many harmonics below and higher the first synchronized frequency. The presence of undesired spatial harmonics can thus cause loss in stator cores and surface mounted magnets (e.g., in the rotors), which results in diminished axial flux motor performance. While it is desirable to eliminate all spatial harmonics aside from the first synchronized frequency, in practice this may not be possible. However, in certain aspects, the axial flux motors provided by certain aspects of the present disclosure have reduced lower order harmonics 84, which have a greater magnitude than higher order spatial harmonics 86.

FIG. 4 shows an example of synchronous frequency components for a 1 slot/pole/phase distributed winding for a motor. A y-axis 90 shows winding function harmonic components (turns) versus an x-axis of 92 that represents a Number of Cycles/$2\pi$ mechanical radians. Again, the numbers on top of select bars (showing synchronous frequency components) represent spatial harmonic orders of respective winding functions. Thus, a first order spatial harmonic for a motor having a synchronized frequency of 7 has a third order spatial harmonic of 21, a fifth order spatial harmonic of 35, and a seventh order spatial harmonic of 49. As can be seen, in a distributed winding, many spatial harmonics at both lower order harmonics (designated 94) and higher order harmonics (designated 96) are minimized or eliminated. In the distributed winding of FIG. 4, it can be seen that lower order spatial harmonics below the first order at 7 are eliminated as compared to the concentrated winding in FIG. 3. Likewise, many higher order spatial harmonics 96 are eliminated when comparing FIG. 3 and FIG. 4, for example, between 21 and 35 and between 35 and 49.

In certain variations, the present disclosure provides an axial flux motor where any lower order spatial harmonics below the synchronized frequency for a first order are reduced or eliminated. In certain other variations, the present disclosure provides an axial flux motor where any higher order spatial harmonics for an order of greater than the first order spatial harmonic for a synchronized frequency are reduced. For example, in one variation, where a synchronized frequency for an axial flux motor is 7, the axial flux motor with reduced spatial harmonics may have no synchronous frequency components below the first order spatial harmonics between 1-6 and may have no synchronous frequency components at higher orders of 8-19, 22-34, and 36-48, by way of example. It should be noted that the third order synchronized frequency at 21 typically will not exist if the winding is a three phase A, B, and C configuration. In certain aspects, spatial harmonics for an order of less than or equal to about 7 are eliminated in the axial flux motor. In other aspects, spatial harmonics for an order of greater than or equal to about 7 are reduced by greater than or equal to about 40% in the axial flux motor, optionally reduced by greater than or equal to about 50% in the axial flux motor, optionally reduced by greater than or equal to about 60% in the axial flux motor, and in certain aspects, optionally reduced by greater than or equal to about 70% in the axial flux motor.

In accordance with certain aspects of the present disclosure, an axial flux motor has a distributed winding and the accompanying spatial harmonics are eliminated. In further aspects, a short pitch configuration in the distributed windings is employed, for example, to further reduce or eliminate the higher order harmonics, for example fifth and seventh order synchronized harmonics in FIG. 4.

Figure 5:
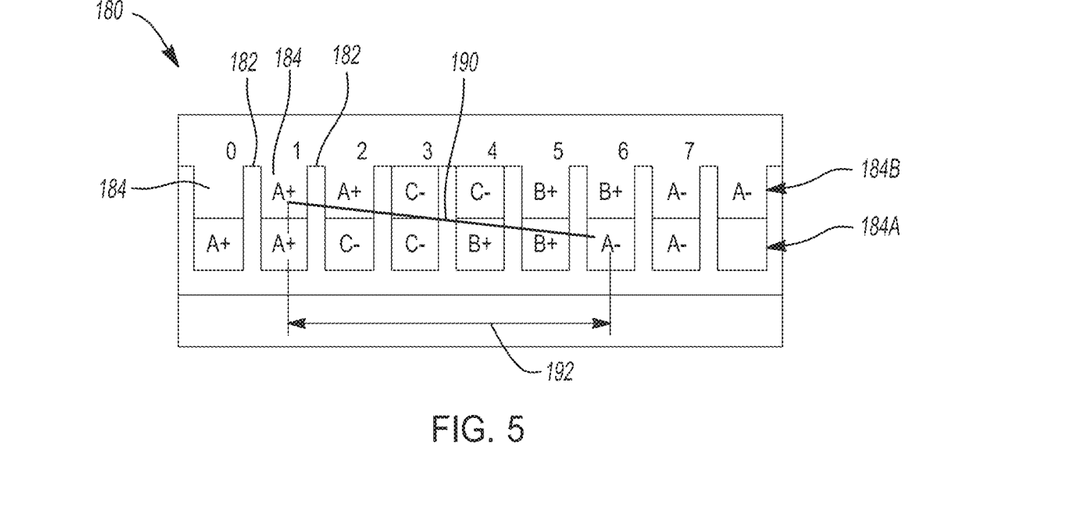
FIG. 5 shows one example of a section of a stator with a distributed winding and a short pitch design for an axial flux motor prepared in accordance with certain aspects of the present disclosure.

FIG. 5 shows one example of a section 180 of a stator with a distributed winding and a short pitch design for an axial flux motor prepared in accordance with certain aspects of the present disclosure. The stator section 180 includes a plurality of posts 182 and a plurality of slots 184 each of which is numbered as 0 to 7. As shown, each slot 184 includes a first layer 184A and a second layer 184B that separately receive windings. Thus, this may be considered to be a two-layer slot configuration. Further, the section 180 has a winding slot distribution of 2. Winding slot distribution is a span of the positive direction of each phase of the winding. For example, the positive direction of phase A winding (A+) in first layer 184A occupies two slots numbers, namely 0 and 1. It should be noted that a respective slot of the plurality of slots may have a maximum number of electrically conductive windings of 10. The stator section 180 can form a stator having 48 slots and thus 8 poles.

A slot stager is 1 in the design shown in FIG. 5, meaning that a mismatch between slots is offset by 1, so that every other slot will have a mismatch between phase windings between the first layer 184A and the second layer 184B. Thus, the second slot 184 labeled "2" has an A+ in the first layer 184A and a C− in the second layer 184B (having a A+/C− configuration), while the fourth slot labeled "4" has an C− in the first layer 184A and a B+ in the second layer 184B (having a C−/B+ configuration), and the sixth slot labeled "6" has an B+ in the first layer 184A and an A− in the second layer 184B (having a B+/A− configuration). Notably, slots labeled 1, 3, 5, and 7 share the same phase windings in the examples shown, namely A+/A+, C−/C−, B+/B+, A−/A− in the first layer 184A/second layer 184B.

One representative electrically conductive winding 190 is shown. The electrically conductive winding 190 shows an orientation of current flow and flux designated by the + and − for the first phase winding (designated "A"). The positive and negative sides of a single electrically conductive winding 190 (e.g., A+) can be disposed in one slot (e.g., slot designated 1) on one side, while the other side of the electrically conductive winding 190 (e.g., A−) is disposed in another slot (e.g., slot designated 6). Thus, electrically conductive winding 190 spans from the second layer 184B in the first slot 184 labeled "1" to the first layer 184A in the sixth slot 184 labeled "6." In this manner, a pitch of the winding spanning from one slot to another "P" (labeled 192) is defined for the electrically conductive winding 190 that spans 5 slots 184. Thus, winding pitch span (P) is 5 for the electrically conductive winding 190, as well as for the other windings shown in stator section 180, although the winding pitch span may be any of the values discussed previously above. The windings on opposing sides of each stator post 182 can be of the same or different/opposite magnetization directions.

The electrically conductive windings may be disposed on one side or slot 184 of the stator post 182, which can have a first magnetization direction (e.g., corresponding to a positive orientation). Windings on an opposite side of the stator post 182 in adjacent slots can have an opposite magnetization direction (e.g., corresponding to a negative magnetization direction). Within one stator slot 184, a set of windings can have the same orientation/polarity or may be a hybrid of orientation and polarity between the first layer 184A and the second layer 184B. Thus, as noted above, every other slot may have a mismatch between phase windings between the first layer 184A and the second layer 184B, so that the windings on one side of a stator post 182 may be both a first magnetization direction (e.g., corresponding to a positive orientation) and a second magnetization direction (e.g., corresponding to a negative orientation), while on the other side of the stator post 182, the windings may have a single orientation, either the first magnetization direction or the second magnetization direction. In this manner, the short pitch distributed winding design can address and minimize high order harmonics.

Notably, the windings in the axial flux stator may have other configurations and these are non-limiting representative examples.

By way of example, reducing spatial harmonics by using short pitch distributed windings can be understood by the following equation:

$$y = \tau * \left(1 - \frac{1}{\nu}\right)$$

where y is the pitch (P) of one winding, τ is the pitch of one pole of a magnet and υ is a reduced spatial harmonic. For the example embodiment described in the context of FIG. 5, y is 5 and τ is 6, so that υ is 6. In this manner, a magnitude of the fifth ($5^{th}$) and seventh ($7^{th}$) spatial harmonics (close to 6) are greatly reduced. Thus, in accordance with certain aspects of the present disclosure, axial flux motor designs are contemplated that include distributed windings to reduce or eliminate suborder harmonics and short pole pitch via a short winding pitch span to reduce or minimize high order harmonics. In this manner, losses in the magnets and ferromagnetic core components can be substantially reduced to enhance performance of the axial flux motors.

Figure 6:
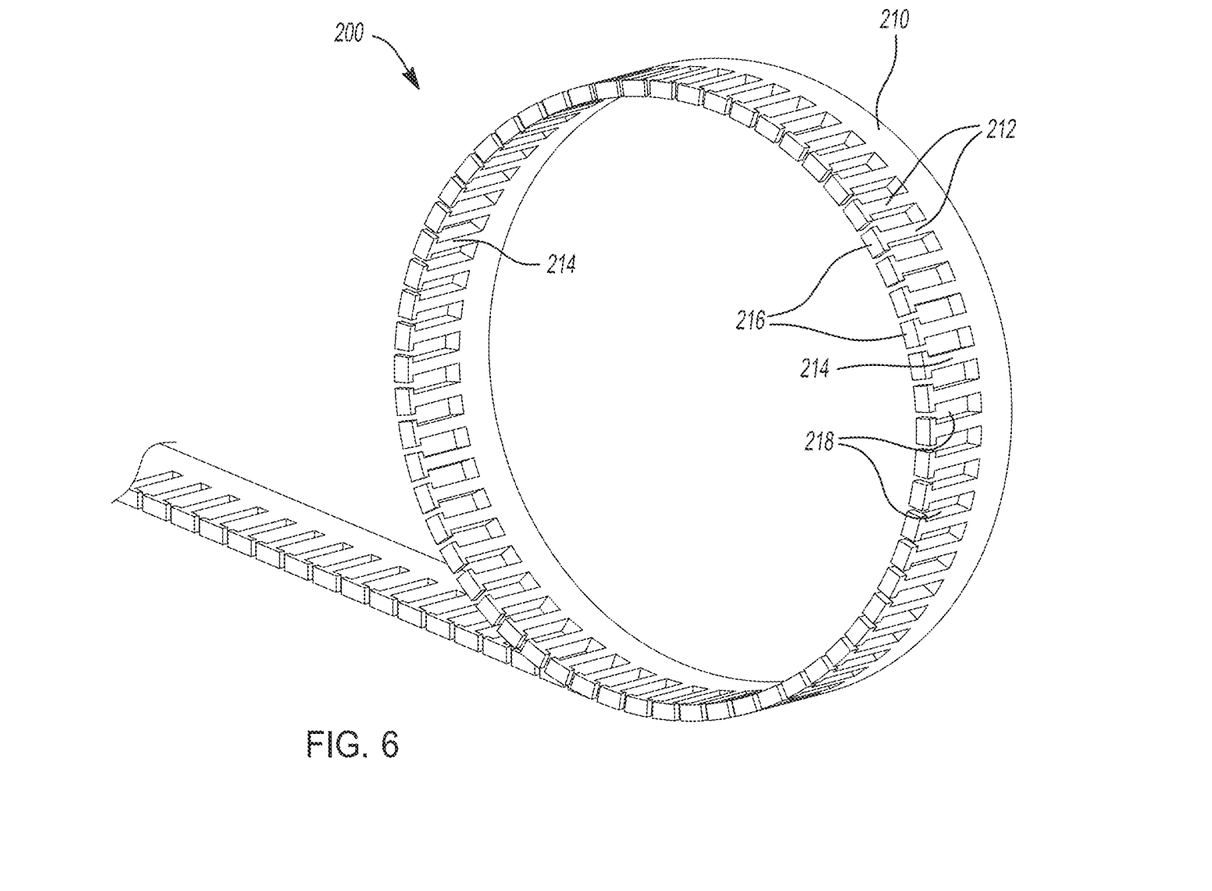
FIG. 6 shows a metal strip having features formed by a lamination manufacturing process that creates a stator core for use in an axial flux motor in accordance with certain aspects of the present disclosure.

In certain aspects, a stator core 200 may be formed by a lamination manufacture process where a laminated steel coil has features defined therein suitable for use as stator posts, including teeth and/or shoes. The stator core 200 can be formed by different manufacturing processes. In one variation, the method may include cutting or punching the slots prior to rolling according to the predefined positions, and then rolling the lamination to form the component. In another variation, the slots can be cut one by one just prior to rolling, so the cutting and rolling can be conducted simultaneously on the automated machine. As shown in FIG. 6, an example of a metal strip 210 is shown that is formed from such a process. The metal strip 210 may be formed of a ferromagnetic material that may be coated, for example, with an insulating material. Suitable ferromagnetic materials for stator core components are known in the art and include magnetic steel, by way of non-limiting example. Where the metal strip 210 is a laminated metal strip comprising a plurality of layers, insulating materials are interleaved (as a coating or distinct layer) between respective layers of the plurality of layers. The insulating materials may be non-magnetic materials. By way of non-limiting example, insulating coating or materials may include a siloxane-based material, like a silicone varnish, or a metal-organic or inorganic insulating material, for example a silicate layer, an oxide layer, a phosphate layer, and equivalents and combinations thereof.

Figure 7:
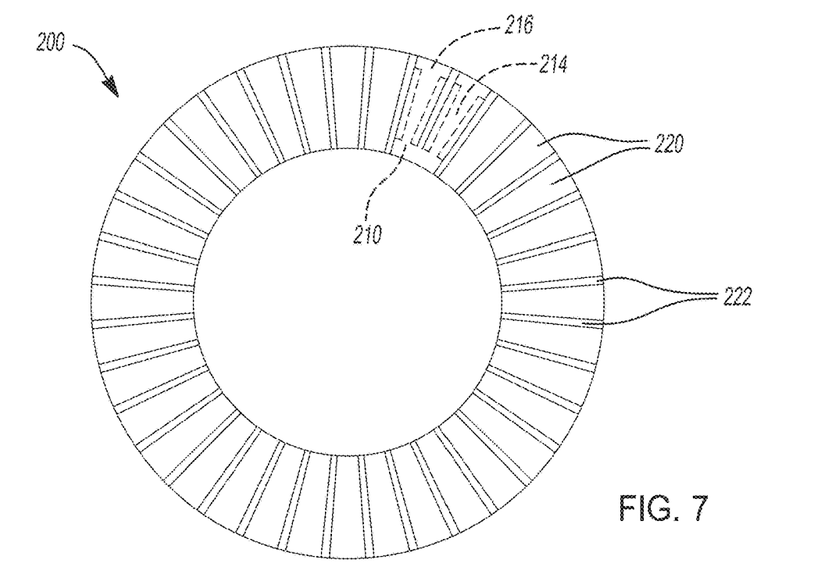
FIG. 7 shows a side view of a stator core formed from the metal strip in FIG. 6.

The metal strip 210 may have one or more features formed therein. Such features may be formed by cutting, etching, stamping, or punching prior to rolling or coiling. For example, the metal strip 210 may be stamped or punched to form predetermined and substantially uniform shapes at predetermined positions along the strip 210. For example, a plurality of stator posts 212 may be formed along the metal strip 210. Each stator post 212 optionally defines a stator tooth 214 and a stator shoe 216 at a terminal end. Between each stator post 212, a void region may define a slot 218. When the metal strip 210 is coiled and joined circumferentially to form the stator core 200, the stator core 200 will define a plurality of stator posts 212 and slots 218 and have an annular or disc-like shape. Notably, while not shown, the metal strip 210 may be rolled multiple times around to form multiple concentric layers in the stator core 200. Although not shown in FIG. 6 or 7, in various aspects, a plurality of electrically conductive windings may then be disposed within various slots 218 in a distributed configuration, such that the electrically conductive windings are disposed in nonadjacent slots, as discussed above. In this manner, a plurality of electromagnetic elements 220 are formed that may be respectively separated by channels 222 to form the stator core 200. The coiled metal strip 210 may be contained in a housing and the stator core 200 may include various other stator elements, as appreciated by those of skill in the art.

Figure 8:
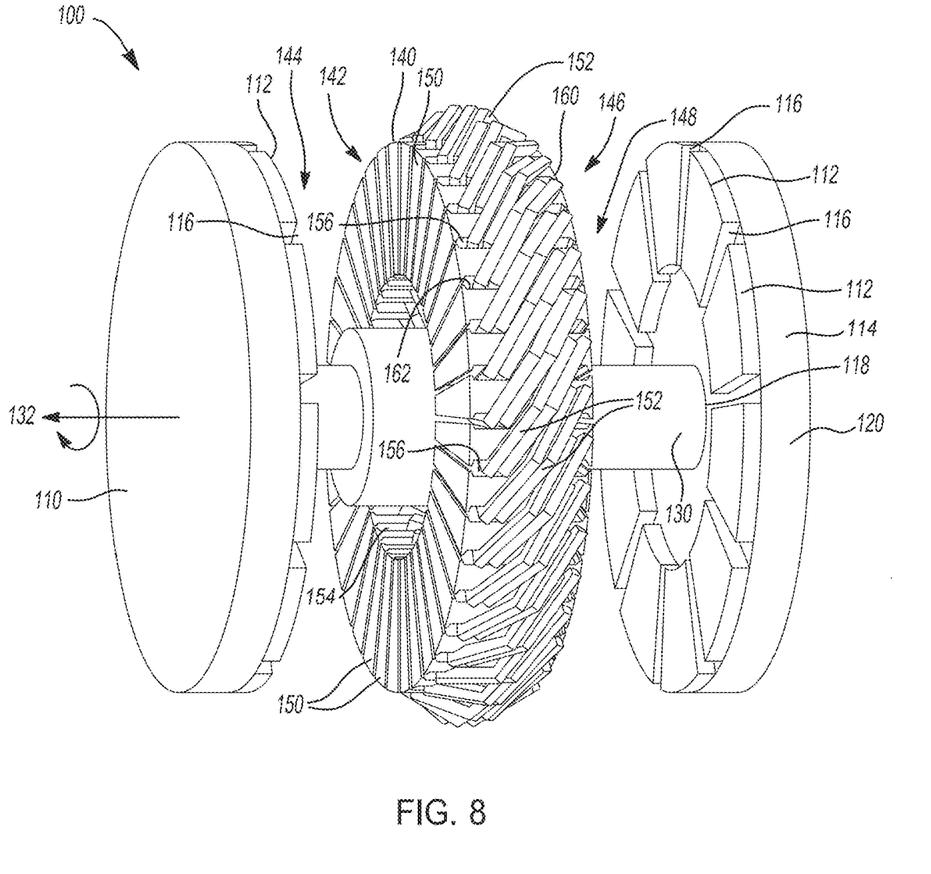
FIG. 8 shows an axial flux motor having one stator having distributed windings and two rotors prepared in accordance with certain aspects of the present disclosure.

A non-limiting example of an electric device in the form of an axial flux motor 100, also known as a pancake motor, is shown in FIG. 8. The motor 100 has a first rotor 110 and a second rotor 120 both connected to and configured to rotate about a rotor shaft 130. Both the first and second rotors 110, 120 have an annular or disc shape with a centrally disposed aperture 118. The rotor shaft 130 passes through the centrally disposed aperture 118. The rotor shaft defines a rotational axis 132 about which the rotor turns.

A stator 140 is disposed between the first rotor 110 and the second rotor 120. The stator 140 may have an annular or disc shape. The stator 140 is fixed and stationary, while the first and second rotors 110, 120 rotate on the rotor shaft 130 during operation. The first rotor 110 faces a first side 142 of the stator 140 and defines a first air gap 144 therebetween. The second rotor 120 faces a second side 146 of the stator 140 and defines a second air gap 148 therebetween.

Though motor 100 is shown to have a central single stator 140 and two external rotors 110, 120, as appreciated by those of skill in the art and discussed further herein, other configurations are also contemplated, including those having two stators and a single rotor or where the electric motor assembly may include more or fewer rotors and/or stators and that the description herein also applies to these other embodiments. Further, though not currently shown, the skilled artisan will appreciate that in various aspects, electric motor assemblies may further include a housing and the rotors and stators and shaft may be disposed within the housing. The housing may be fixed to a vehicle frame and the shaft may be coupled to a gearbox, for example a reduction gearbox, within the vehicle.

Each of the first rotor 110 and the second rotor 120 can have the same design (facing in opposite directions towards the stator 140) and thus the common components will be described herein. Each of the first rotor 110 and second rotor 120 includes a plurality of permanent magnets 112 affixed to a rotor body 114. The permanent magnets 112 may have alternating polarity. Each permanent magnet 112 defines a channel 116 therebetween, which may extend radially along a face of the respective rotor. In this manner, the permanent magnets 112 and the channel 116 can together define a plurality of magnetic poles. Notably, as appreciated by those of skill in the art, the number, shape, placement, and orientation of permanent magnets 112 may vary from those shown.

The stator 140 includes a plurality of stator segments or core components 150 about which a plurality of electrically conductive windings 152 are wrapped in a distributed configuration. The stator 140 defines a plurality of slots 156 between respective stator core components 150, where the electrically conductive windings 152 may extend over or bridge the slots 156. The stator core components 150 may comprise a ferromagnetic core, such as a plurality of laminated core components formed of a plurality of layers of ferromagnetic material, such as magnetic steel. Such ferromagnetic material layers are typically isolated from one another by an insulating material interleaved therebetween. Alternatively, the stator core components 150 may be formed from a soft molded composite comprising a plurality of magnetic particles having an insulating coating and optionally distributed in a polymeric resin, such as a nonmagnetic resin. As noted above, each electrically conductive winding 152 may span from one slot (e.g., first slot 160) to another nonadjacent slot (e.g., second slot 162) in the distributed winding configuration. The stator 140 may be fixed and stationary. Although not illustrated, other winding configurations and technologies as understood in the art are also contemplated, so long as a distributed winding design is employed. The conductive wire or windings 152 may comprise copper or copper alloys, which can generate a magnetic field when current is applied. The electrically conductive windings 152 may be a wire having a round cross-section or rectangular cross-section, by way of example. In other aspects, the electrically conductive windings 152 may be pre-formed electrically conductive hairpin windings that may be electrically connected and attached to respective terminals within the stator slots.

Rotor shaft 130 may pass through a centrally disposed aperture 154 in the stator 140 and be supported by bearings (not shown) that align the rotors 110, 120 with respect to the stator 140 while allowing rotation of the rotor shaft 130. The plurality of electrically conductive windings 152 of the stator 140 may be formed of copper or other conductive wires configured to generate a magnetic field when current is applied so as to interact with magnetic fields of the plurality of permanent magnets 112 having alternating poles located on the first and second rotors 110, 120. Different regions of the stator 140 may be selectively energized to impart a rotational force on the first and second rotors 110, 120 causing the rotors 110, 120 and the rotor shaft 130 to rotate with respect to the rotational axis 132. The axial flux motor 100 having a single stator 140 and first and second rotors 110, 120 is capable of use in high torque applications, including for use in an electric or hybrid vehicle. In such a variation, as noted above, a housing encasing the motor 100 may be attached to the vehicle frame and at least one output from an end of the rotor shaft 130 is coupled to a reduction gearbox or directly to the vehicle drive wheels. The vehicle application of the axial flux motor 100 is provided as an exemplary embodiment and is not intended to be limiting.

In the variation shown in FIG. 8, each electrically conductive winding 152 spans from the first side 142 of the stator to the second side 146. Thus, the plurality of electrically conductive windings 152 interact with both the first rotor 110 across the first air gap 144 and the second rotor 120 across the second air gap 148.

Figure 9:
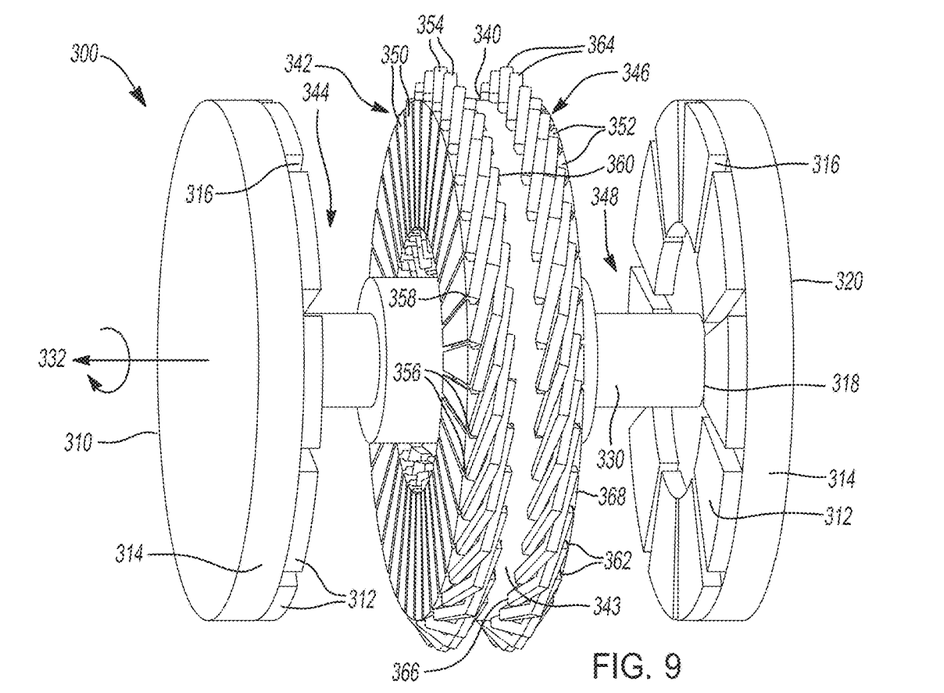
FIG. 9 shows another variation of an axial flux motor having one stator with two distinct sides of distributed windings and two rotors prepared in accordance with certain aspects of the present disclosure.

Another variation of a non-limiting example of an electric device in the form of an axial flux motor 300 is shown in FIG. 9. The motor 300 has a first rotor 310 and a second rotor 320 both connected to and configured to rotate about a rotor shaft 330. Both the first and second rotors 310, 320 have an annular or disc shape with a centrally disposed aperture 318. To the extent that the components described in the context of FIG. 8 are the same as those described here in the context of the axial flux motor 300, they will not necessarily be introduced or described again herein for brevity, but will be understood to be present and have the same properties or function as those components described above in the context of axial flux motor 100 in FIG. 8.

A stator 340 is centrally disposed between the first rotor 310 and the second rotor 320. The stator 340 may have an annular or disc shape. The first rotor 310 faces a first side 342 of the stator 340 and defines a first air gap 344 therebetween. The second rotor 320 faces a second side 346 of the stator 340 and defines a second air gap 348 therebetween.

Each of the first rotor 310 and the second rotor 320 can have the same design (facing in opposite directions towards the stator 340) and thus the common components will be described herein. Each of the first rotor 310 and second rotor 320 includes a plurality of permanent magnets 312 affixed to a rotor body 314. The permanent magnets 312 may have alternating polarity. Each permanent magnet 312 defines a channel 316, so that the permanent magnets 312 and the channel 316 can together define a plurality of magnetic poles. Notably, the number, shape, and placement of the permanent magnets may be varied from those shown in FIG. 9.

The stator 340 includes a plurality of stator segments or core components. As shown, the first side 342 of the stator 340 has a first plurality of core components 350. The second side 346 of the stator 340 has a second plurality of core components 352. The first side 342 is physically separated from the second side 346 of the stator 340. The material forming a stator body 343 that separates the first side 342 from the second side 346 may be the same as in the previous embodiments, which can be an insulated lamination steel or a soft magnetic composite. The shape and slot openings of the stator body 343 in FIGS. 8 and 9 may be of a similar design. However, in FIG. 9, a major difference in the designs is the winding configuration. A first plurality of electrically conductive windings 354 are wrapped in a distributed configuration, such that they are not disposed in adjacent slots. The first side 342 of stator 340 defines a first plurality of slots 356 between respective stator core components 350, where the electrically conductive windings 354 may extend over or bridge the slots 356. As noted above, each electrically conductive winding 354 may span from one slot (e.g., first slot 358) to another nonadjacent slot (e.g., second slot 360) in the distributed winding configuration.

The second side 346 of stator 340 defines a second plurality of slots 362 between respective stator core components 352. A second plurality of electrically conductive windings 364 are wrapped in a distributed configuration. The electrically conductive windings 364 may extend over or bridge the second plurality of slots 362. As noted above, each electrically conductive winding 364 of the second plurality may span from one slot (e.g., first slot 366) to another nonadjacent slot (e.g., second slot 368) in the distributed winding configuration.

In stator 340, the first plurality of slots 356 and second plurality of slots 362 on stator 340 are separated on the two sides of the stator body 343. In this manner, the first plurality and second plurality of electrically conductive windings 354 and 364 can be separated on the two sides 342, 346 as shown in FIG. 9. However, the electrically conductive windings can also extend from one side to the other as shown in FIG. 8 that in certain aspects can provide greater design flexibility for the winding configuration.

In the variation shown in FIG. 9, each first and second pluralities of electrically conductive windings 354, 364 is disposed on distinct first and second sides 342, 346 of the stator 340. Thus, the first plurality of electrically conductive windings 354 interact with the first rotor 310 across the first air gap 344, while the second plurality of electrically conductive windings 364 and the second rotor 320 across the second air gap 348. Although not illustrated, as discussed above, other winding configurations and technologies as understood in the art are also contemplated, so long as a distributed winding design is employed.

The first and second pluralities of electrically conductive windings 354, 364 of the stator 340 may be formed of copper or other conductive wires configured to generate a magnetic field when current is applied so as to interact with magnetic fields of the plurality of permanent magnets 312 having alternating poles located on the first and second rotors 310, 320.

Different regions of the stator 340 may be selectively energized to impart a rotational force on the first and second rotors 310, 320 causing the rotors 310, 320 and the rotor shaft 330 to rotate with respect to a rotational axis 332. The axial flux motor 300 having a single disc-shaped stator 340 and first and second disc-shaped rotors 310, 320 is capable of use in high torque applications, including for use in an electric or hybrid vehicle. As noted above, in this variation of the axial flux motor, the windings are separated onto two different sides of the stator. The number of slots and poles can be varied. Further, a different pitch for the windings can be designed. Different layers of windings in a given slot can be selected. Furthermore, hairpin style of electrically conductive windings can be employed.

In such a variation, as noted above, a housing encasing the motor 300 may be attached to the vehicle frame and at least one output from an end of the rotor shaft 330 is coupled to a reduction gearbox or directly to the vehicle drive wheels. Again, the vehicle application of the axial flux motor 300 is provided as an exemplary embodiment and is not intended to be limiting.

Figure 10:
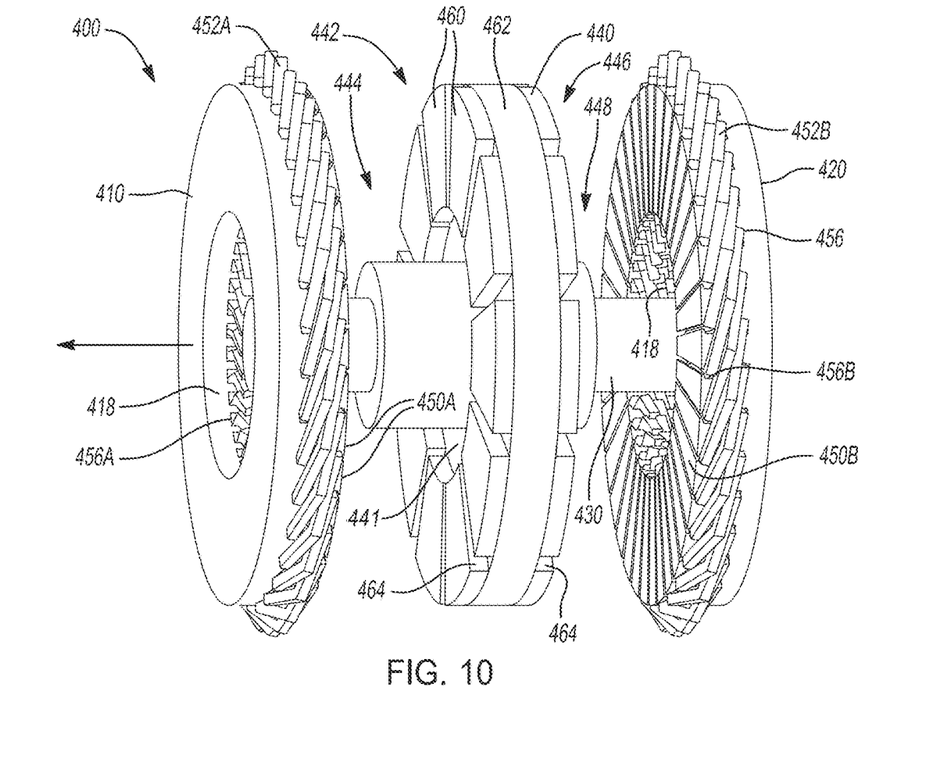
FIG. 10 shows another variation of an axial flux motor having one centrally disposed rotor with two stators each having distributed windings prepared in accordance with certain aspects of the present disclosure.

In yet another variation of a non-limiting example of an electric device in the form of an axial flux motor 400 is shown in FIG. 10, which has one rotor and two stators. To the extent that the components described here in the context of the axial flux motor 400 are the same as those described in FIG. 9, for brevity they will not necessarily be reintroduced or described again herein. However, these components will be understood to be present and have the same properties or function as those components described above, such as in the context of axial flux motor 100 in FIG. 8.

The motor 400 has a first stator 410 and a second stator 420 both configured to be stationary during operation. The first stator 410 has a first plurality of stator segments or core components 450A about which a first plurality of electrically conductive windings 452A are wrapped in a distributed configuration. The second stator 420 has a second plurality of stator segments or core components 450B about which a second plurality of electrically conductive windings 452B are likewise wrapped in a distributed configuration. The first stator 410 defines a plurality of first slots 456A between respective stator core components 450A, where the first plurality of electrically conductive windings 452A may extend over or bridge the first slots 456A. The second stator 420 defines a plurality of second slots 456B between respective stator core components 450B, where the first plurality of electrically conductive windings 452A may extend over or bridge the first slots 456A. The first or second plurality of electrically conductive windings 452A, 452B may extend over or bridge the pluralities of first or second slots 456A, 456B. As noted above, each electrically conductive winding 452A, 452B of the first or second pluralities may span from one slot (e.g., first slot) to another nonadjacent slot (e.g., second slot) in the distributed winding configuration.

The stator core components 450A, 450B may comprise a ferromagnetic core, such as a plurality of laminated core components formed of a plurality of layers of ferromagnetic material or a soft molded composite comprising a plurality of magnetic particles having an insulating coating and optionally distributed in a polymeric matrix, such as a non-magnetic polymeric matrix. As noted above, each electrically conductive winding 452A, 452B of the first and second pluralities of electrically conductive windings may span from one first or second slot 456A, 456B to another nonadjacent first or second slot 456A, 456B in the distributed winding configuration. Although not illustrated, other winding configurations and technologies as understood in the art are also contemplated, so long as a distributed winding design is employed.

The motor 400 has a rotor 440 that is configured to rotate about a rotor shaft 430. The rotor 440 has an annular or disc shape with a centrally disposed aperture 441. The rotor 440 is centrally disposed between the first stator 410 and the second stator 420. The rotor 440 may have an annular or disc shape. The first stator 410 faces a first side 442 of the rotor 440 and defines a first air gap 444 therebetween. A second side 446 of the rotor 440 faces the second stator 420 and defines a second air gap 448 therebetween.

The rotor 440 has a plurality of permanent magnets 460 affixed to a rotor body 462. The permanent magnets 460 may have alternating polarity. Each permanent magnet 460 defines a channel 464, so that the permanent magnets 460 and the channel 464 can together define a plurality of magnetic poles. Notably, the number, shape, and placement of the permanent magnets may be varied from those shown in FIG. 10.

In the embodiment shown in FIG. 10, each first and second pluralities of electrically conductive windings 452A and 452B are disposed on distinct first and second sides 442, 446 of the rotor 440. Thus, the first plurality of electrically conductive windings 452A of the first stator 410 interact with the rotor 440 across the first air gap 444, while the second plurality of electrically conductive windings 452B of the second stator 420 interact with the rotor 440 across the second air gap 448. In this variation of the axial flux motor, two stators each having windings are disposed onto two different sides of the centrally disposed rotor. The number of slots and poles can be varied. Further, a different pitch for the windings can be designed. Different layers of windings in a given slot can be selected. Furthermore, hairpin style of electrically conductive windings can be employed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An axial flux motor having reduced spatial harmonics comprising:
    a first rotor comprising a plurality of magnets;
    a second rotor comprising a plurality of magnets;
    a rotor shaft coupled to the first rotor and the second rotor and defining a rotational axis about which the first rotor and the second rotor are configured to rotate; and
    a stator having a first side facing the first rotor and defining a first axially-extending air gap therebetween, an opposite second side facing the second rotor and defining a second axially-extending air gap therebetween, and a stator body extending between the first side and the opposite second side, wherein the stator is stationary and comprises a plurality of electromagnetic components defining a plurality of magnetic poles, the first side of the stator defining a first plurality of posts extending in a first axial direction from the stator body and a first plurality of slots disposed between the first plurality of posts, the second side of the stator defining a second plurality of posts extending from the stator body in a second axial direction opposite the first axial direction and a second plurality of slots disposed between the second plurality of posts; and
    a plurality of distributed electrically conductive windings disposed in nonadjacent slots of the first plurality of slots and the second plurality of slots, each of the plurality of distributed electrically conductive windings spanning across the stator body from the first side of the stator to the second side,
    wherein each of the plurality of distributed electrically conductive windings has a winding pitch span of greater than or equal to 3 slots to less than or equal to 20 slots,
    wherein the winding pitch span of each of the plurality of distributed electrically conductive windings is the same, and
    wherein spatial harmonics for orders of less than or equal to a first order harmonic frequency are substantially eliminated and spatial harmonics for orders of greater than the first order harmonic frequency are reduced in the axial flux motor.

2. The axial flux motor of claim 1, wherein each of the plurality of distributed electrically conductive windings has the winding pitch span that is greater than or equal to 3 slots to less than or equal to 10 slots.

3. The axial flux motor of claim 1, wherein the winding pitch span is 5 slots.

4. The axial flux motor of claim 1, wherein a respective slot of the first plurality of slots or the second plurality of slots has a maximum number of electrically conductive windings of 10.

5. The axial flux motor of claim 1, wherein a number of a slot stager is greater than or equal to 1 slot and less than or equal to 8 slots.

6. The axial flux motor of claim 1, wherein a number of the plurality of magnetic poles is greater than or equal to 2 poles to less than or equal to 30 poles.

7. The axial flux motor of claim 1, wherein spatial harmonics for orders of less than or equal to the first order harmonic frequency are eliminated in the axial flux motor and spatial harmonics for orders of greater than the first order harmonic frequency are reduced by greater than or equal to 50%.

8. The axial flux motor of claim 1, wherein the first plurality of slots and the second plurality of slots each comprise greater than or equal to 12 slots to less than or equal to 96 slots.

9. The axial flux motor of claim 1, wherein a number of the plurality of magnetic poles is 8, a pitch of the plurality of magnetic poles is 6 mechanical degrees, the first and second plurality of slots each comprise 48 slots, there is one layer of electrically conductive windings per slot, a number of electrically conductive windings per slot is 1, and a number of a slot stager is 1 slot.

10. The axial flux motor of claim 1, wherein the axial flux motor is a three-phase motor and comprises three phases of distributed electrically conductive windings, and wherein a value of the number of slots per magnetic pole per phase of the axial flux motor is an integer.

11. The axial flux motor of claim 1, wherein the stator is formed from an insulated metal strip having a plurality of void regions defined therein, and wherein the insulated metal strip is coiled to form an annular shape that defines the first plurality of posts, the second plurality of posts, the first plurality of slots, and the second plurality of slots, and wherein the first and second plurality of slots of the stator are defined by the plurality of void regions in the insulated metal strip.

12. The axial flux motor of claim 1, wherein each of the plurality of distributed electrically conductive windings has a short pitch configuration, and wherein the winding pitch span of each of the plurality of distributed electrically conductive windings is less than a pitch of the plurality of magnetic poles defined by the plurality of electromagnetic components of the stator.

13. The axial flux motor of claim 1, wherein each of the plurality of distributed electrically conductive windings spans across the stator body between one of the first plurality of slots and a nonadjacent one of the second plurality of slots.

14. The axial flux motor of claim 1, wherein, when the first rotor and the second rotor rotate, each of the plurality of distributed electrically conductive windings interacts with both the first rotor across the first axially-extending air gap and the second rotor across the second axially-extending air gap.

15. An axial flux motor having reduced spatial harmonics comprising:
 two disc-shaped rotors each comprising a plurality of magnets;
 a rotor shaft coupled to the two disc-shaped rotors and defining a rotational axis about which the disc-shaped rotors are configured to rotate;
 a disc-shaped stator disposed between the two disc-shaped rotors, wherein the disc-shaped stator is stationary and has a first side, an opposite second side, and a stator body extending in an axial direction between the first side and the opposite second side, the first side of the disc-shaped stator defining a first plurality of posts extending in a first axial direction from the stator body and a first plurality of slots comprising greater than or equal to 12 slots to less than or equal to 96 slots, the second side of the disc-shaped stator defining a second plurality of posts extending from the stator body in a second axial direction opposite the first axial direction and a second plurality of slots comprising greater than or equal to 12 slots to less than or equal to 96 slots;
 a first axially-extending air gap defined between a first of the disc-shaped rotors and the first side of the disc-shaped stator;
 a second axially-extending air gap defined between a second of the disc-shaped rotors and the second side of the disc-shaped stator;
 a plurality of distributed electrically conductive windings disposed in nonadjacent slots of the first plurality of slots and the second plurality of slots, wherein each of the plurality of distributed electrically conductive windings spans across the stator body between one of the first plurality of slots and a nonadjacent one of the second plurality of slots; and
 a plurality of electromagnetic components defining a plurality of magnetic poles, wherein the plurality of electromagnetic components is defined by the disc-shaped stator and the plurality of distributed electrically conductive windings,
 wherein each of the plurality of distributed electrically conductive windings has a winding pitch span of greater than or equal to 3 slots to less than or equal to 20 slots, and wherein the winding pitch span of each of the plurality of distributed electrically conductive windings is the same, and
 wherein spatial harmonics for orders of less than or equal to a first order harmonic frequency are substantially eliminated and spatial harmonics for orders of greater than the first order harmonic frequency are reduced in the axial flux motor.

16. The axial flux motor of claim 15, wherein spatial harmonics for orders of less than or equal to the first order harmonic frequency are eliminated in the axial flux motor and spatial harmonics for orders of greater than the first order harmonic frequency are reduced by greater than or equal to 50%.

17. The axial flux motor of claim 15, wherein a number of the plurality of magnetic poles is 8, a pitch of the plurality of magnetic poles is about 6 mechanical degrees, the first and second plurality of slots each comprise 48 slots, there is one layer of electrically conductive windings per slot, a number of electrically conductive windings per slot is 1, and a number of a slot stager is 1 slot.

* * * * *